United States Patent [19]
Opal

[11] Patent Number: 5,801,632
[45] Date of Patent: Sep. 1, 1998

[54] CLIMATE CONTROLLED OUTDOOR ENCLOSURE

[75] Inventor: Anthony P. Opal, Glen Ellyn, Ill.

[73] Assignee: Telco Services, Inc., Itasca, Ill.

[21] Appl. No.: 715,802

[22] Filed: Sep. 19, 1996

Related U.S. Application Data

[63] Continuation-in-part of Ser. No. 300,009, Sep. 6, 1994, abandoned.
[51] Int. Cl.⁶ .................................................. G08B 19/00
[52] U.S. Cl. ......................... 340/585; 361/1; 361/688; 361/691; 361/724
[58] Field of Search .......................... 340/585; 361/724, 361/691, 688

[56] References Cited

U.S. PATENT DOCUMENTS

| | | | |
|---|---|---|---|
| 4,276,545 | 6/1981 | Jarvis et al. | 340/545 |
| 4,482,785 | 11/1984 | Finnegan et al. | 340/585 |
| 5,001,602 | 3/1991 | Suffi et al. | 361/724 |

OTHER PUBLICATIONS

Steiner Electric Company Brochure *Climate Control Products*, Specifier's Guide 1993–1994, 1992 Hoffman Engineering Company.

*Primary Examiner*—Glenn Swann
*Attorney, Agent, or Firm*—Baker & McKenzie

[57] ABSTRACT

A tamper-resistant climate-controlled enclosure is provided for the outdoor housing of electronic equipment. The box-like structure provides a sealed environment for electronic equipment. The enclosure includes an intrusion alarm, a high temperature alarm and a low temperature alarm. A heater and an air conditioner are provided to maintain the temperature inside the enclosure between 60° F. and 75° F. to ensure that the electronic equipment housed therein works properly. The enclosure is especially useful for housing microcells used to transmit cellular telephone calls.

15 Claims, 9 Drawing Sheets

CLIMATE CONTROLLED OUTDOOR ENCLOSURE

This application is a continuation-in-part of application Ser. No. 08/300,009 filed Sep. 6, 1994, now abandoned.

FIELD OF THE INVENTION

This invention relates generally to enclosures for housing electronic equipment. More specifically, this invention relates to a tamper-proof, weather-proof enclosure for the outdoor containment and protection of electronic equipment. Still more particularly, this invention relates to specially designed enclosures for housing microcells used in the cellular phone, digital transmission, cellular digital package data (CDPD) and personal communications services (PCS) industries.

BACKGROUND

As of 1994, approximately thirty million cellular phones were in use world-wide. By the year two thousand, it is fully expected that cellular phone use will grow to approximately one hundred million units. This explosion in the growth of cellular phone use has created transmission problems for the cellular phone carriers. Essentially, two options are available to the carriers in their efforts to provide sufficient transmission capabilities to meet the growing demand.

The first option is to construct additional macrocells which require the construction of towers, shelters (buildings) and other large transmission facilities. Construction of macrocells is expensive and it may also be difficult to obtain the required real estate or zoning permits in congested urban markets. Macrocells are high-powered, high channel capacity base stations serving a 5 to 10 mile area (a "cell").

The second option is to build an even larger number of microcells and scatter them throughout the community. However, microcells are smaller than macrocells and have lower power, smaller channel capacity and serve a smaller range. Microcells do not require a tower and may be stored in relatively small enclosures (indoor or outdoor) or boxes that are approximately three to four feet tall, three to four feet wide and three to four feet deep. The microcell enclosures may be conveniently scattered throughout the community under billboards, on top of buildings or along freeways. The relatively small size of the microcells makes them relatively discreet so that they are neither unsightly nor in conflict with local zoning laws.

However, because the cellular phone carriers must employ a large number of microcells as compared to a relatively small number of macrocells, the use of microcells creates certain security and operational difficulties. First, the small size and sheer number of the microcells renders them vulnerable to vandalism. Because the microcells are normally placed underneath billboards, underneath freeway overpasses, or in other out-of-the-way places, they are normally hidden from plain view by the public and therefore many instances of vandalism go unnoticed. Accordingly, there is a need for an enclosure for microcells that is relatively vandal proof and graffiti resistant.

Further, microcells include electronic equipment that must be operated within certain temperature ranges. Specifically, most electronic equipment is reliable only when operated in the temperature range from about 40° F. to 110° F. Some electronic equipment is reliable only when operated above 68° F. and below 90° F. Accordingly, in cold climates, the enclosure must include heaters to keep the equipment sufficiently warm to operate properly. Furthermore, in warm climates and even in moderate climates where the enclosure is subject to direct sunlight, the enclosure must also include a cooling system to keep the temperature below 110° F. and to reduce the humidity inside the enclosure.

The microcells must be able to operate continuously without interruption if they are to be economically feasible. One microcell can handle dozens of cellular phone calls per minute and therefore the loss of a microcell for even an hour can result in the loss of tens of thousands of cellular phone calls for the cellular phone carrier. It is also anticipated that microcells will be used for transmissions other than cellular phone calls including digital transmission, cellular digital packet data (CDPD) and personal communications services (PCS).

Microcells also require a clean environment because dust, dirt and insects can damage electronic equipment, cause malfunctions and increase the need for regular maintenance. Therefore, operating a microcell in a sealed environment would keep the equipment clean and reduce maintenance costs. However, sealing the microcell off from outside air makes it more difficult to keep the equipment cool in the summer months.

Accordingly, there is a strong need for an outdoor enclosure that can safely accommodate electronic equipment such as microcells and other devices. The enclosure must be strong and durable so it is tamper proof as well as graffiti proof or graffiti-resistant. The enclosure must also be climate controlled for use in areas where the ambient air temperature may exceed 90° F. or may fall below 68° F. The enclosure would also be preferably sealed to prevent the introduction of dust, dirt and insects. The enclosure must also include a communication system so that the operator is aware of any unauthorized break-ins of the enclosure or if the inside air temperature within the enclosure exceeds a pre-determined high temperature limit or a pre-determined low temperature limit. Further, it is conceivable that many carriers will also demand that the enclosure be equipped with an uninterrupted power supply (UPS) so that the microcells will continue to operate in the event of a municipal power failure.

SUMMARY OF THE INVENTION

The present invention satisfies the aforenoted needs by providing a durable outdoor enclosure for accommodating electronic equipment, such as the equipment used for microcells for the cellular telephone industry. The enclosure of the present invention includes a box structure that includes at least one door. When the door is closed, the box is sealed to prevent the entry of any outside air. Accordingly, when the doors are closed, the inside of the box is a closed or sealed environment. The box is connected to a primary power supply such as a municipal power line or is equipped with its own generator or power supply such as a solar power system.

The box is preferably equipped with an air conditioner that indirectly reduces the temperature inside the box when it exceeds a first predetermined temperature. Air conditioners will normally be required in climates where the temperature can exceed 90° F. Specifically, the air conditioner is provided in combination with a closed-loop heat exchanger. The air conditioner cools ambient air which then passes through the one side of a closed-loop heat exchanger. Air inside the box which needs to be cooled passes through a second side of the closed-loop heat exchanger. Fans on both sides of the heat exchanger may be used to assist air flow.

Thus, the air conditioner does not directly cool the air inside the box but, in turn, cools the ambient air which then absorbs heat from air inside the box in the closed-loop heat exchanger.

A means for removing condensation from the inside of the box is preferably provided for boxes used in humid climates. In one embodiment, a tube with a trap or barrier is employed that allows water to pass out of the tube but does not allow outside air to flow freely through the tube to the interior of the box. The trap may be a loop or U-shaped turn in the tube that is partially filled with oil. Accumulated condensation will flow out of the trap through the oil. The oil provides a barrier to prevent the free flow of ambient air from entering the box. For boxes used indoors, a burner or electric heating device may be provided on the outside of the box to re-vaporize the condensation that has been bled from the inside of the box. This feature is useful if there is no nearby plumbing fixture or drain for the bled condensation.

The enclosure must also include heaters in those environments where the ambient temperature may fall below 40° F. In the preferred embodiment, the heaters are provided in the form of one or more high-resistance coils or included within the air conditioner system. If a plurality of heaters is employed, the heaters or coils may be disposed strategically around the inside of the box.

Both the air conditioner and the heater should include separate thermostats so that both the air conditioner and heater are turned on and off as needed. The enclosure should also include a low temperature alarm for generating an alarm signal when the air inside the box drops below a predetermined low temperature limit such as 40° F. The enclosure should also include a high temperature alarm which generates a high temperature alarm signal when air inside the box exceeds a pre-determined high temperature limit, such as 110° F.

A third alarm that should be provided is an intrusion alarm or burglar alarm. In the preferred embodiment of the present invention, the intrusion alarm is always activated within a predetermined time period when the door is opened. However, a specially designed toggle switch is disposed at an out-of-the-way location inside the box. The toggle switch is provided to deactivate the intrusion alarm. An experienced and authorized operator will know how to turn off the toggle switch within the predetermined time period so that an intrusion alarm signal will not be generated. However, an unauthorized person will not know the location of this toggle switch or how to operate the switch and therefore the intrusion alarm signal will be generated after the predetermined time period lapses. Other useful alarms include a power failure or shut down alarm and a moisture content or water alarm.

It is also anticipated that a control means will be coupled with the means for communicating the low temperature alarm signal, high temperature alarm signal and intrusion signal to the remote control station. The control means would enable the operator to modify the temperature at which the high temperature alarm is generated, the temperature at which the low temperature alarm is generated, the temperature at which the air conditioner is activated, the temperature at which the air conditioner is deactivated, the temperature at which the heater is activated and the temperature at which the heated is deactivated. Further, the control means would also enable the operator to troubleshoot the electronics housed within the enclosure from a remote location thereby reducing the number of routine maintenance visits.

It is also foreseeable that the enclosure provided by the present invention be used in underground vaults as well as on mobile land vehicles, such as trucks. The enclosures of the present invention may also be deployed at any outdoor location with sufficient space and with access to electrical power. In the absence of available electrical power, the enclosures provided by the present invention may be operated in conjunction with generators, battery systems or even solar power systems. To keep the generators safe from vandals, the enclosures may be enlarged to accommodate the generators or a separate enclosures may be constructed to house the generators.

It is therefore an object of the present invention to provide a tamper-proof enclosure for the outdoor storage of electronic equipment.

Yet another object of the present invention is to provide a climate-controlled enclosure for the outdoor storage of electronic equipment.

Still another object of the present invention is to provide a tamper-proof climate-controlled outdoor housing for microcells.

Still other objects of the present invention include providing an improved outdoor enclosure for electronic equipment used in digital transmission, cellular digital packet data (CDPD) and personal communications services (PCS).

Still another object of the present invention is to provide an improved outdoor enclosure for microwave and utility power equipment, fiber optic telecommunication equipment, computer equipment, cable TV transmission equipment and equipment for petrochemical and ancillary applications.

Other features and advantages of the present invention will appear from the following description in which only certain embodiments have been set forth in conjunction with the accompanying drawings.

BRIEF DESCRIPTION OF THE DRAWINGS

The invention is illustrated more or less diagrammatically in the following drawings wherein.

It should be understood that the drawings are not necessarily to scale and that the embodiments are sometimes illustrated by graphic symbols and diagrammatic representations. In certain instances, details which are not necessary for an understanding of the present invention or which render other details difficult to perceive may be omitted. It should be understood, of course, that the invention is not necessarily limited to the particular embodiments illustrated herein.

DETAILED DESCRIPTIONS OF THE DRAWINGS

Like reference numerals will be used to refer to like or similar parts from Figure to Figure in the following description of the drawings.

Figure 1:
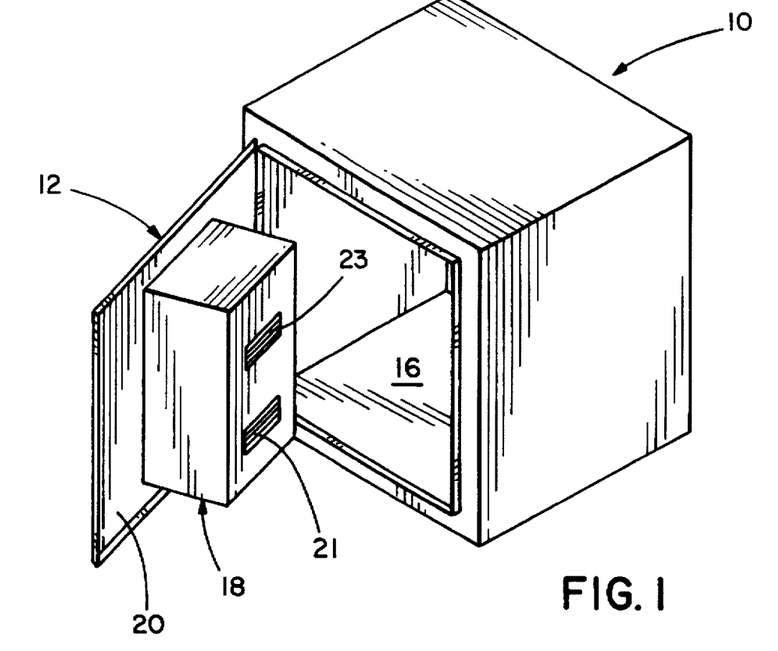
FIG. 1 is a perspective view of an enclosure made in accordance with the present invention.

Turning to FIG. 1, a suitable enclosure 10 is provided for the safe, outdoor housing of microcells, the enclosure 10 shown in FIG. 1 includes a front door 12. A rear door and/or side doors would be optional and included primarily to facilitate access to the electronic equipment disposed in the interior of the enclosure 10 and indicated generally at 16. FIG. 1 also illustrates the convenience of attaching the air conditioner or cooling apparatus 18 to the inside surface 20 of the front door 12. The air inside the enclosure 10 enters the air conditioner 18 through the vent 23 and exits through the vent 21.

Figure 2:
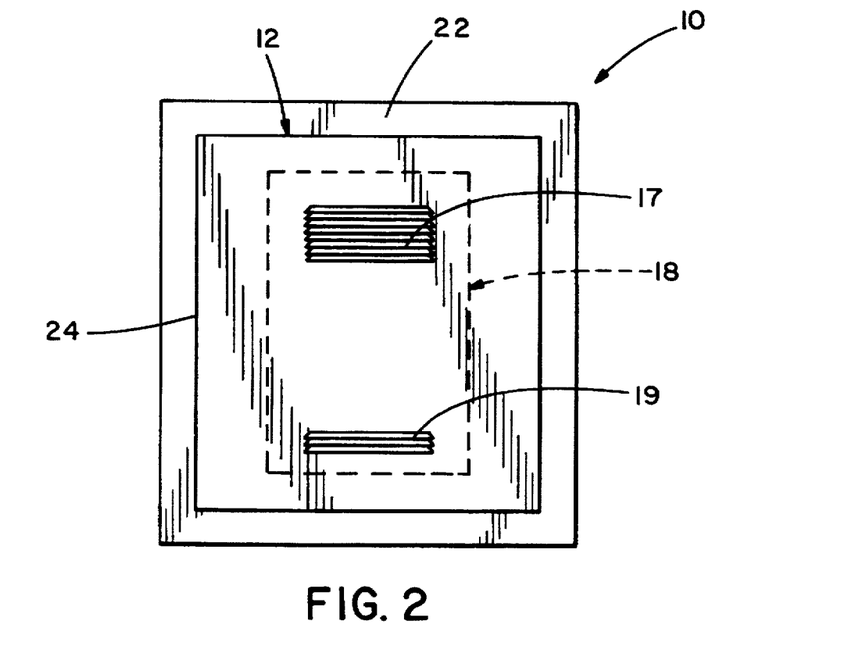
FIG. 2 is a front elevational view of the enclosure shown in FIG. 1.

Turning to FIG. 2, the enclosure 10 features a front surface 22 which accommodates the door 12. The plurality or even a continuous row of hinges should be disposed along the left edge 24 of the door to provide a secure attachment of the door 12 to the front 22 of the enclosure 10. Further, the door 12 should also be equipped with at least one and preferably a plurality of high quality locks to secure the door 12 in the locked position. Ambient air enters the air conditioner 18 through the vent 17 and exits the air conditioner 18 through the vent 19.

Figure 3:
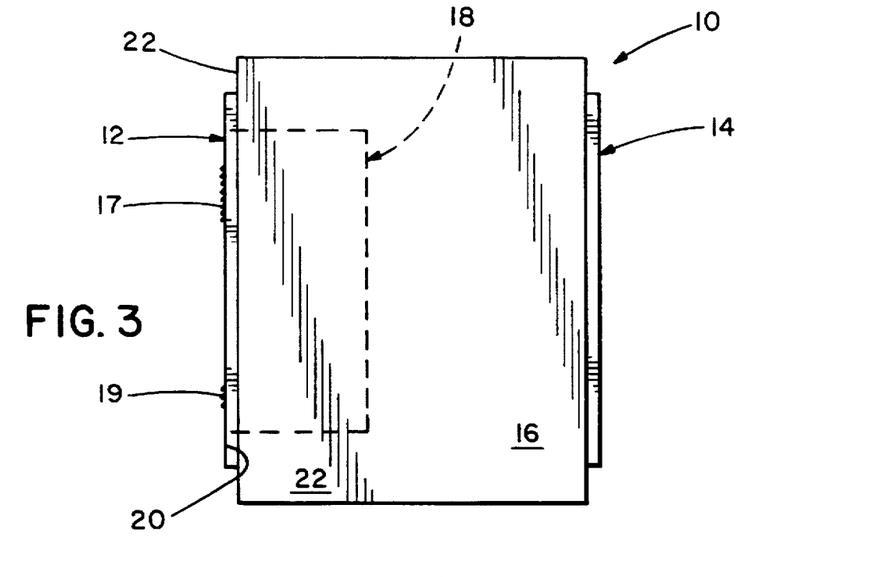
FIG. 3 is a side elevational view of the enclosure shown in FIG. 1.

As shown in FIG. 3, the enclosure 10 is preferably designed so that enough space is provided between the equipment area shown generally at 16 and the front end 22 of the enclosure so that the air conditioner unit 18 can be conveniently disposed on the inside surface 20 of the front door 12. In this manner, the air conditioner unit 18 is safely disposed within the enclosure 10 and is not hanging outside the enclosure 10 which may render it susceptible to vandalism or theft.

Figure 4:
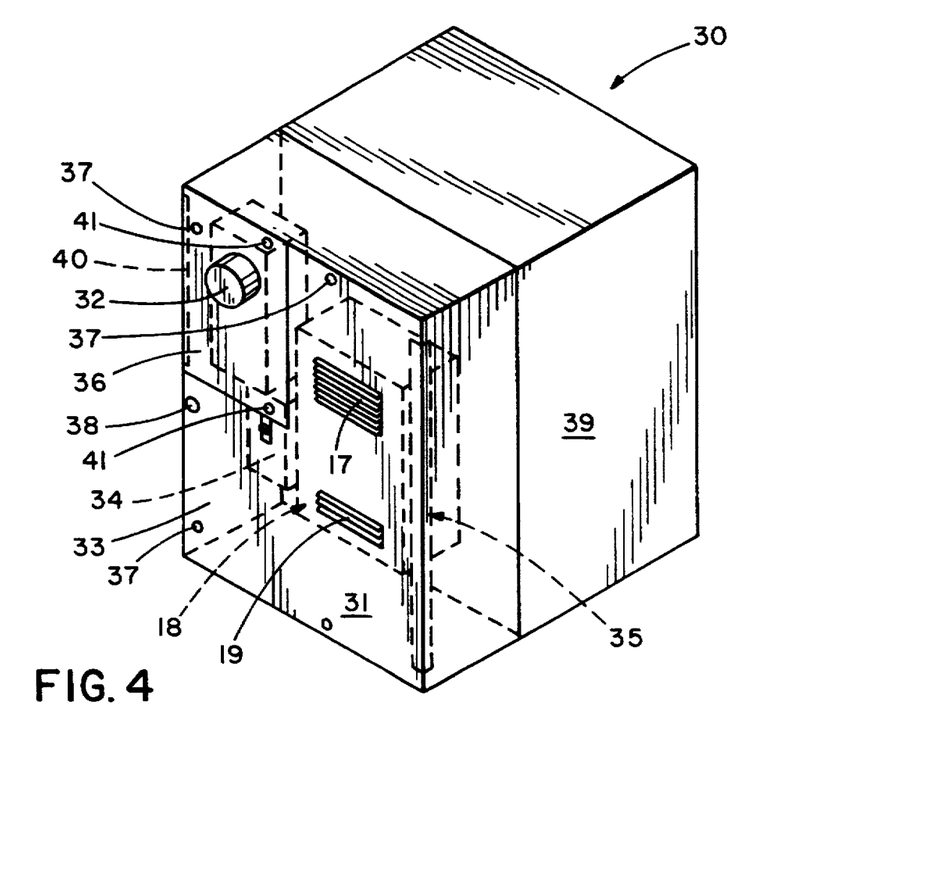
FIG. 4 is a perspective view an alternative enclosure still made in accordance with the present invention.

FIG. 4 is a perspective view of an alternative enclosure 30 which differs from the enclosure 10 shown in FIGS. 1–3 primarily in the inclusion of exterior compartment 31 which houses an electrical meter 32, a service circuit breaker 34 and the air conditioner 18. The exterior compartment 31 includes a front door 33 that is attached with a piano hinge 35, four worm gear operated locks 37 and a lock 38 with a replaceable core. The door 33 allows access to the air conditioner 18 and the breaker box 34. The meter 32 is disposed behind its own separate door 36. The door 36 includes its own piano hinge 40 and two compression locks 41. The electrical service provider will have its own key for the compression locks 41 to gain access to the meter 32 and will not require or have access to the rest of the exterior compartment 31 or to the inside of the enclosure 30. Another alternative design would be to include a single door 36 for the meter 32 and house the air conditioner 18 and the breaker box 34 inside the main compartment 39 with the electronic equipment (not shown). Thus, the power consumption of the enclosure 30 may be monitored by the utility without providing access to the electronic components contained within the enclosure 30.

The lock 38 has a replaceable core which is used to facilitate control of access to the enclosure 30. During the installation of the enclosure, various workers require access to the enclosure 30. Those workers include the general contractor, electrical contractor, telephone company personnel and radio engineers. After the enclosure is fully constructed and operational, the microcell operator can replace the core of the lock 38 so that only qualified service personnel of the microcell operator will have access to the inside of the enclosure 30 and other workers, who contributed to the construction of the enclosure, will no longer have access.

Figure 5:
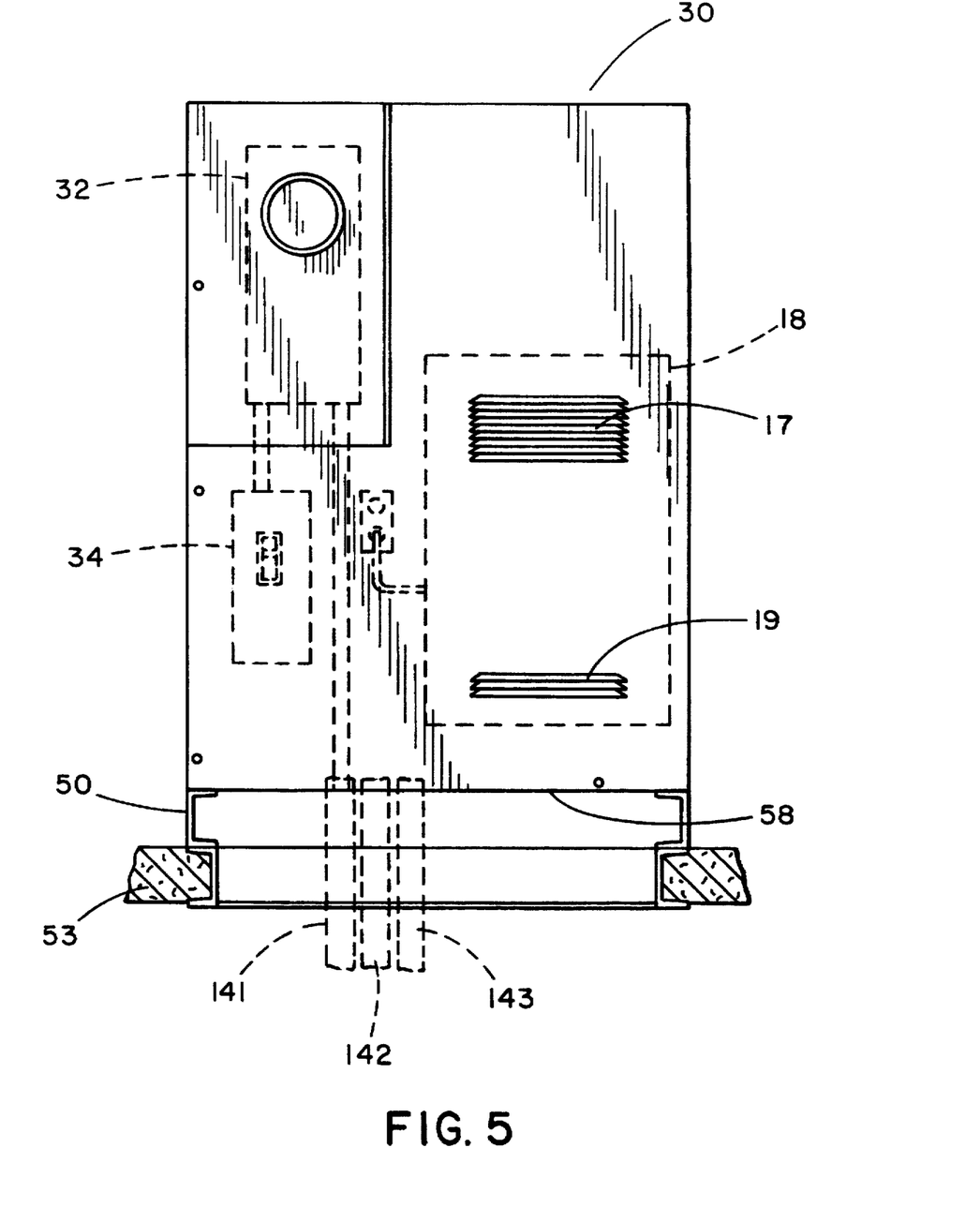
FIG. 5 is a front elevational view of the enclosure shown in FIG. 4 and further showing the enclosure mounted on a concrete pad.

The enclosure 30 shown in the FIG. 5 also features a base 50 which facilitates the mounting of the enclosure 30 on a concrete pad shown generally at 53. Any wires or conduits passing into or out of the enclosure 30 preferably enter the enclosure 30 from the bottom 58. Electric service is provided by cable through the conduit 141; telecommunication cables are provided through the conduit 142; and antennae cables may be provided through the conduit 143.

Figure 6:
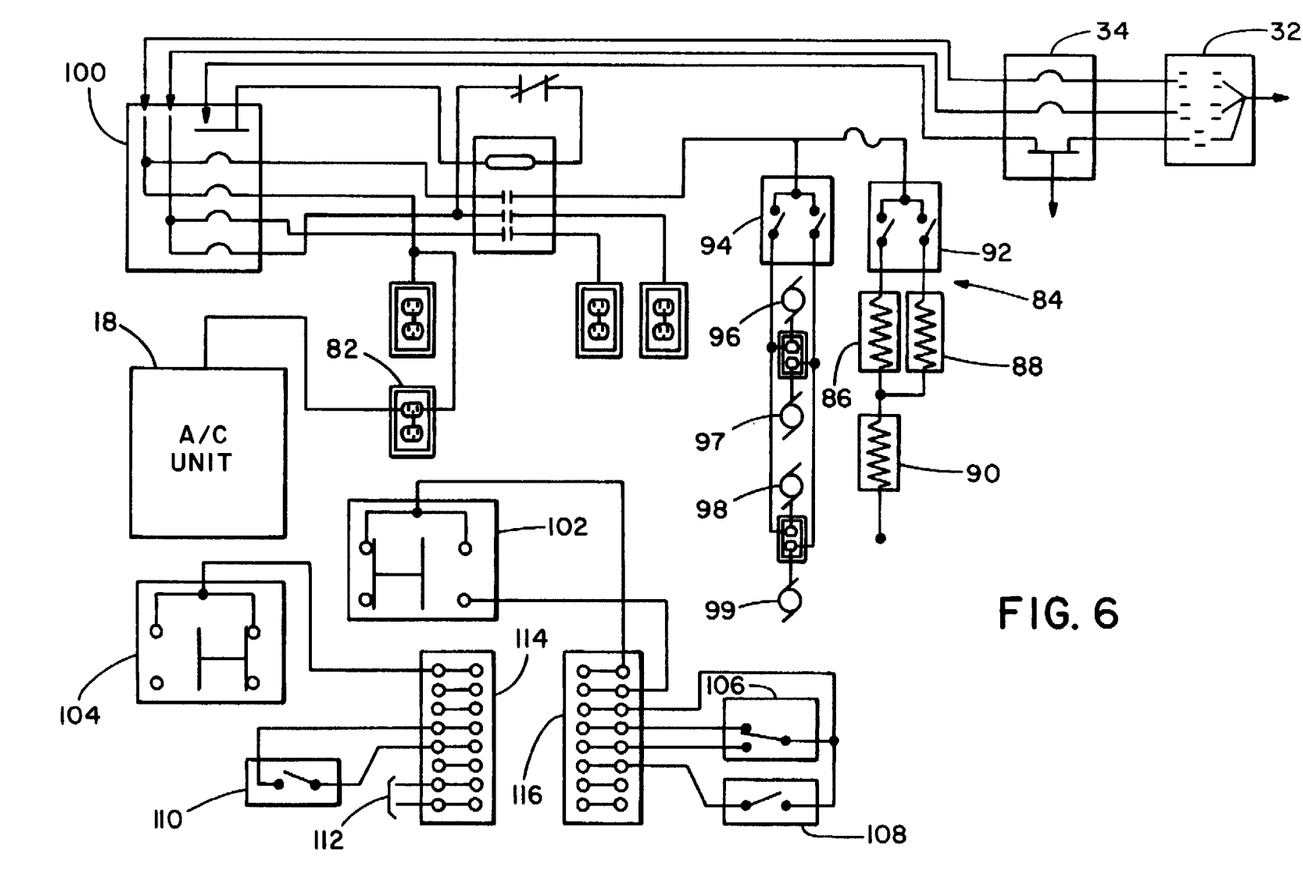
FIG. 6 is a schematic wiring diagram for an enclosure made in accordance with the present invention.

A schematic wiring diagram for the purposes of illustration is provided in FIG. 6. As noted above, an enclosure 10 or 30 made in accordance with the present invention includes air conditioner 18. The air conditioner 18 draws its power from the receptacle 82. A heater is shown generally at 84. The heater 84 features three separate heating elements 86, 88 and 90 which are preferably resistor-type heating elements that can be placed strategically around the interior of the enclosure 10 or 30. The heater 84 features a thermostat 92. A primary cooling thermostat is shown at 94 which activates and deactivates the circulation fans shown at 96, 97, 98 and 99. The service circuit breaker is shown at 34 and the electrical meter is shown at 32. A separate breaker box is shown at 100. A high temperature alarm is shown at 102 which will generate a high temperature alarm signal that can be transmitted to an offsite control station by digital remote communication device integrated into the electronics of the system. This aspect of the invention is discussed more fully below with reference to the alternative embodiment of FIGS. 10 through 12. Similarly, a low temperature alarm is shown at 104 which will generate a low temperature alarm signal to be sent to the offsite control station by the same communication device. An intrusion alarm is shown at 106 which is activated any time the door is opened. An intrusion alarm signal will be generated and transmitted to the offsite control station unless the toggle switch shown at 108 is thrown to deactivate the intrusion alarm signal. A water detector is shown at 110 which will generate a water detection alarm signal in the event condensation accumulates inside the enclosure 10 or in the event the enclosure leaks. A shut-down alarm is indicated at 112 that will notify the operator in the event of a power failure. The various alarm signals are transmitted to the outside control station through the terminal blocks 114, 116.

Figure 7:
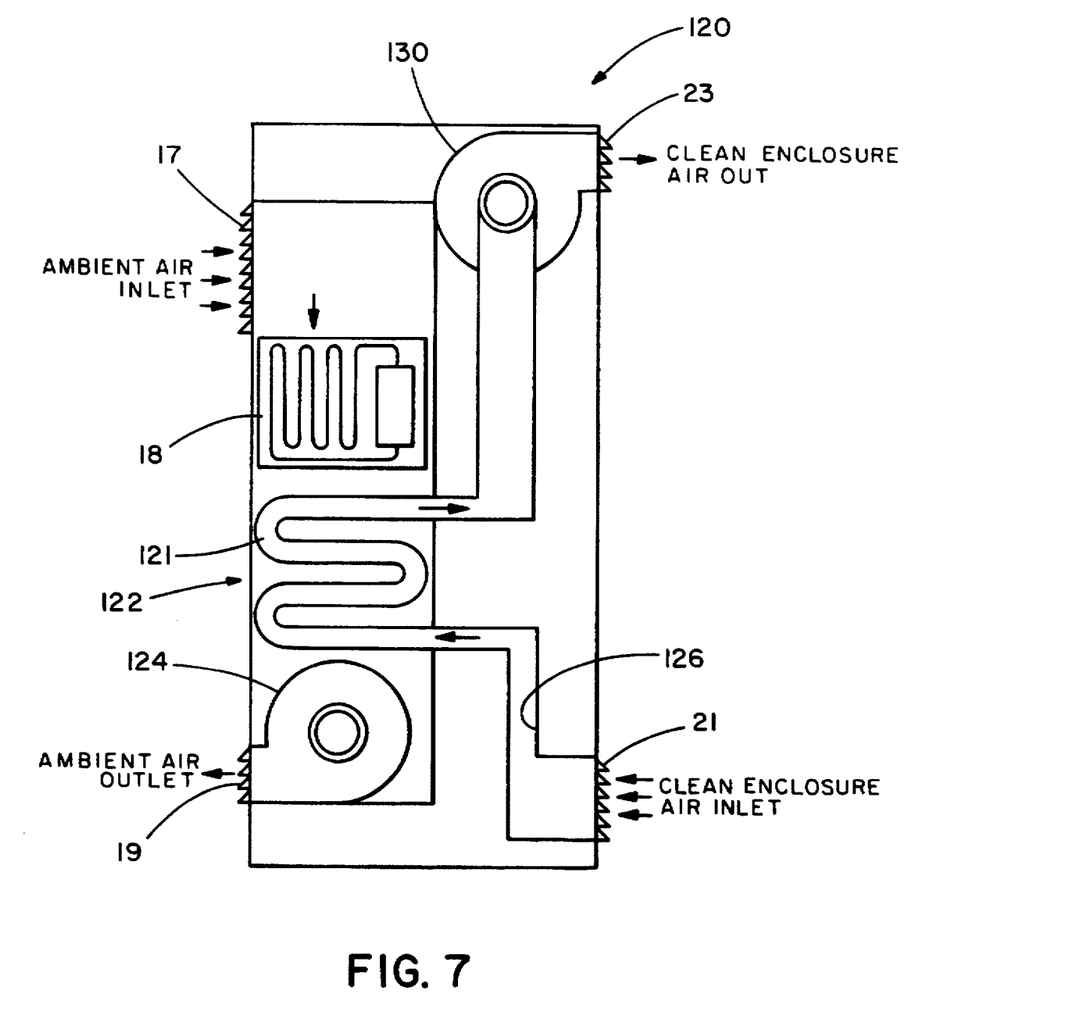
FIG. 7 is a schematic diagram of a closed-loop heat exchanger made in accordance with the present invention.

The closed-loop air conditioner 120 is illustrated in FIG. 7. Ambient air enters the air conditioner 18 by passing through vent 17 (see also FIG. 1). The air conditioner 18 cools the ambient air and passes it over the coils 121 of the heat exchanger 122. The ambient air exits the outlet vent 19 (see also FIG. 1) under the pressure drop provided by the fan 124. Clean air from the inside of the enclosure 10 passes through the vent 21 and up the conduit 126 and through the coils 121 of the heat exchanger 122. It is within the exchanger 122 that heat is absorbed from clean air inside the enclosure 10 by the just-cooled ambient air. Just-cooled clean enclosure air is then blown out the vent 23 and back into the enclosure by the fan 130.

Figure 8:
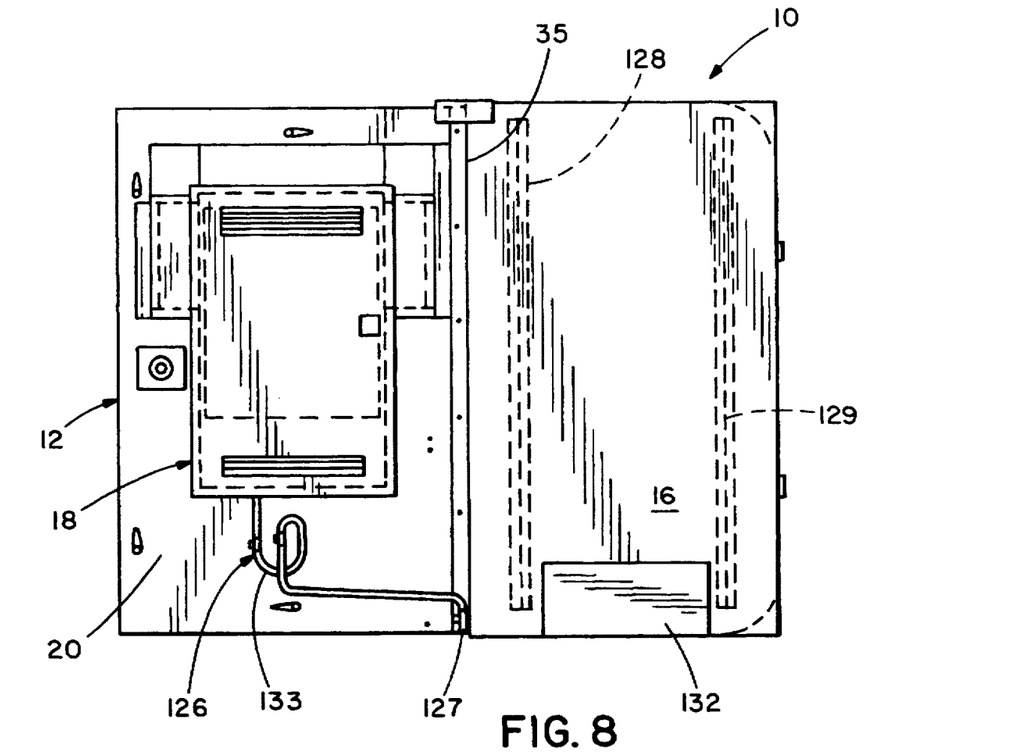
FIG. 8 is a front elevational view showing a door-mounted air conditioner with a bleed tube in accordance with the present invention.

Turning now to FIG. 8, the enclosure 10 includes an air conditioner 18 that is mounted on the inside surface 20 of the front door 12, and is equipped with a tube 126 that is used for bleeding condensation from the air conditioner 18. As water condenses against the cold inside surface of the air conditioner 18, the water (under the force of gravity) will gravitate toward the tube 126. The water then proceeds down the tube 126 and out of the outlet 127 which is disposed adjacent to the hinge 35. A water barrier formed by a small quantity of water will remain at the lower U-shaped portion 133 of the tube 126 to prevent any entry of ambient air. The brackets 128, 129 disposed in the interior 16 of the enclosure 10 enable easy installation of the equipment to be housed inside the enclosure 10.

Figure 9:
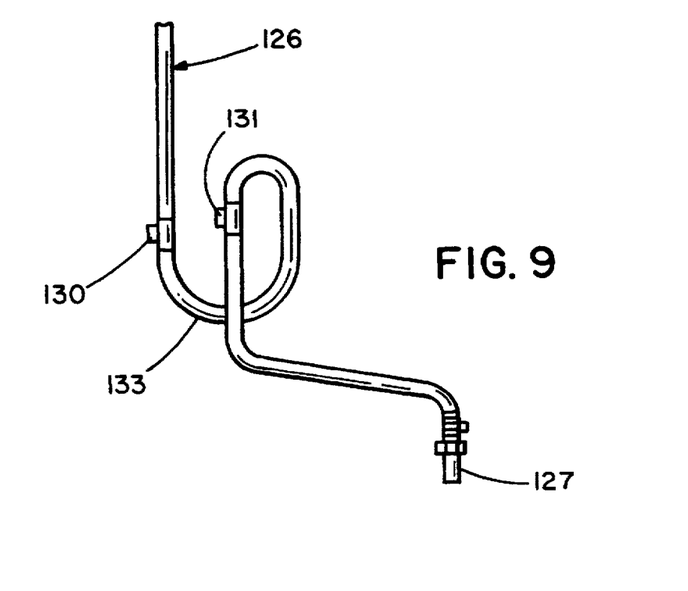
FIG. 9 is a partial elevational view of a tube used to bleed condensation from the interior of an enclosure made in accordance with the present invention.

Turning to FIG. 9, the tube 126 may be easily mounted along the inside surface 20 of the door 12 with clamps such as 130, 131. Returning to FIG. 8, a battery pack 132 may also be provided at the bottom of the enclosure in the event the municipal power supply fails.

Figure 10:
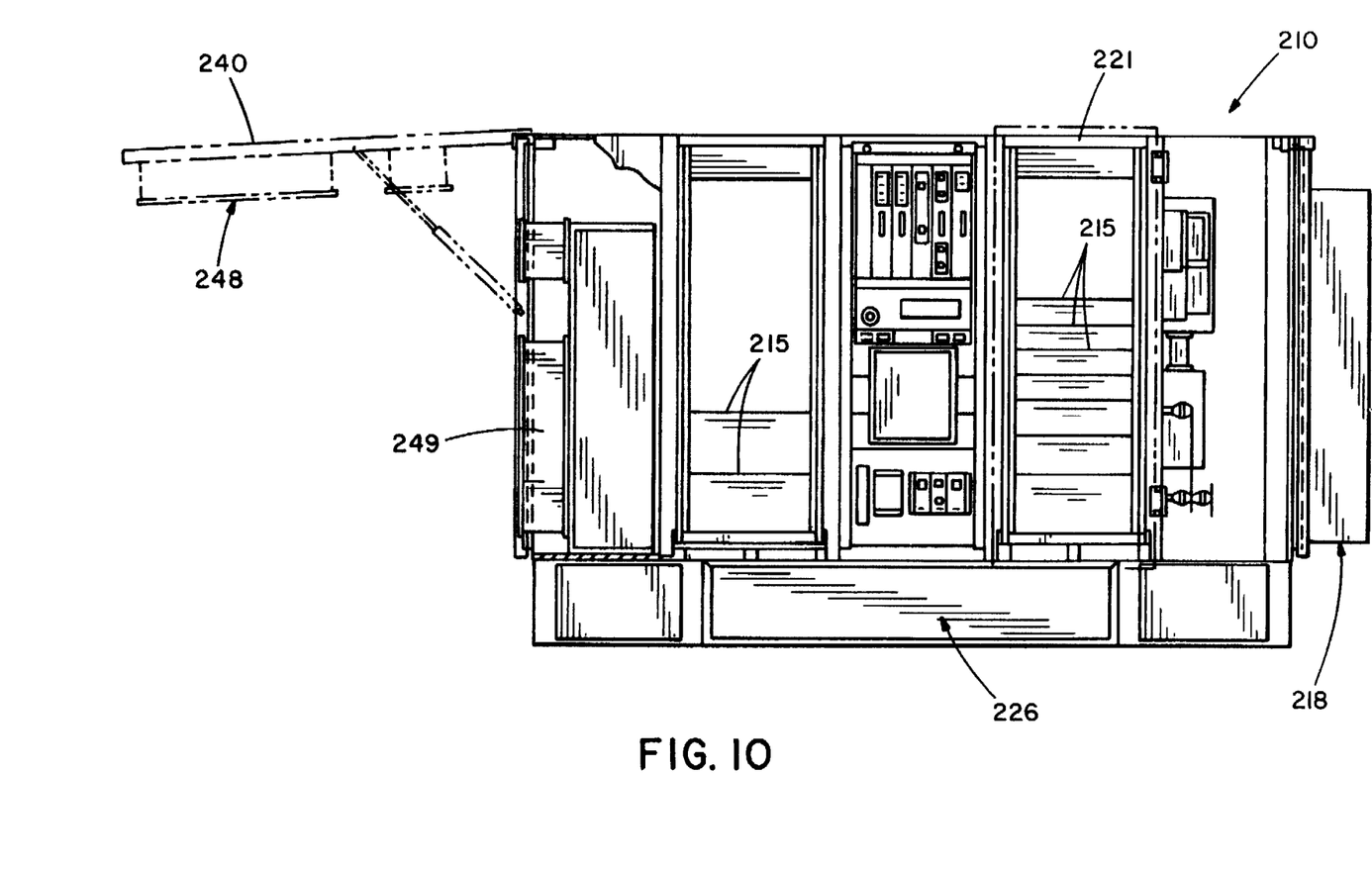
FIGS. 10, 11 and 12 are front, side and top plan views, respectively, of an alternative embodiment of an enclosure made in accordance with the present invention.
Figure 11:
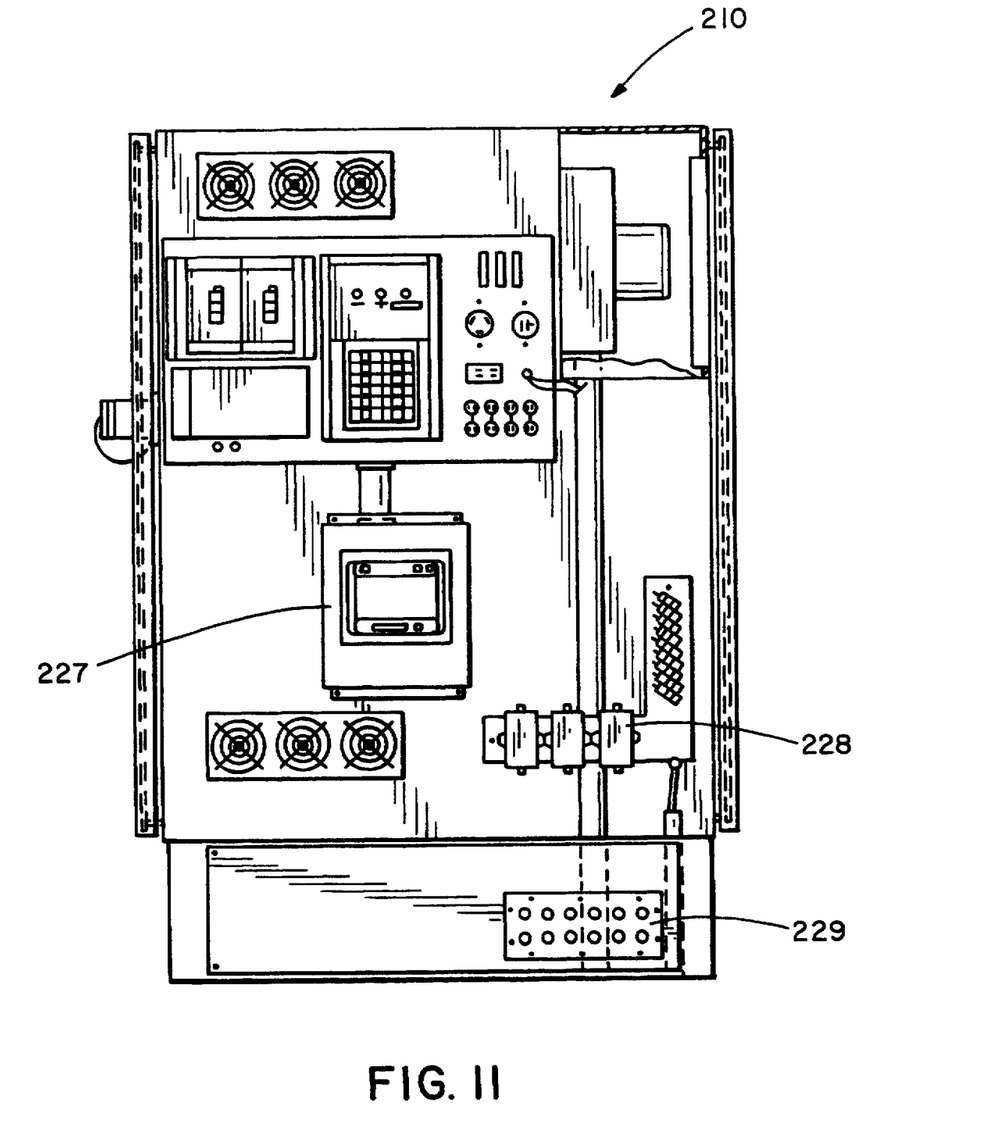
Figure 12:
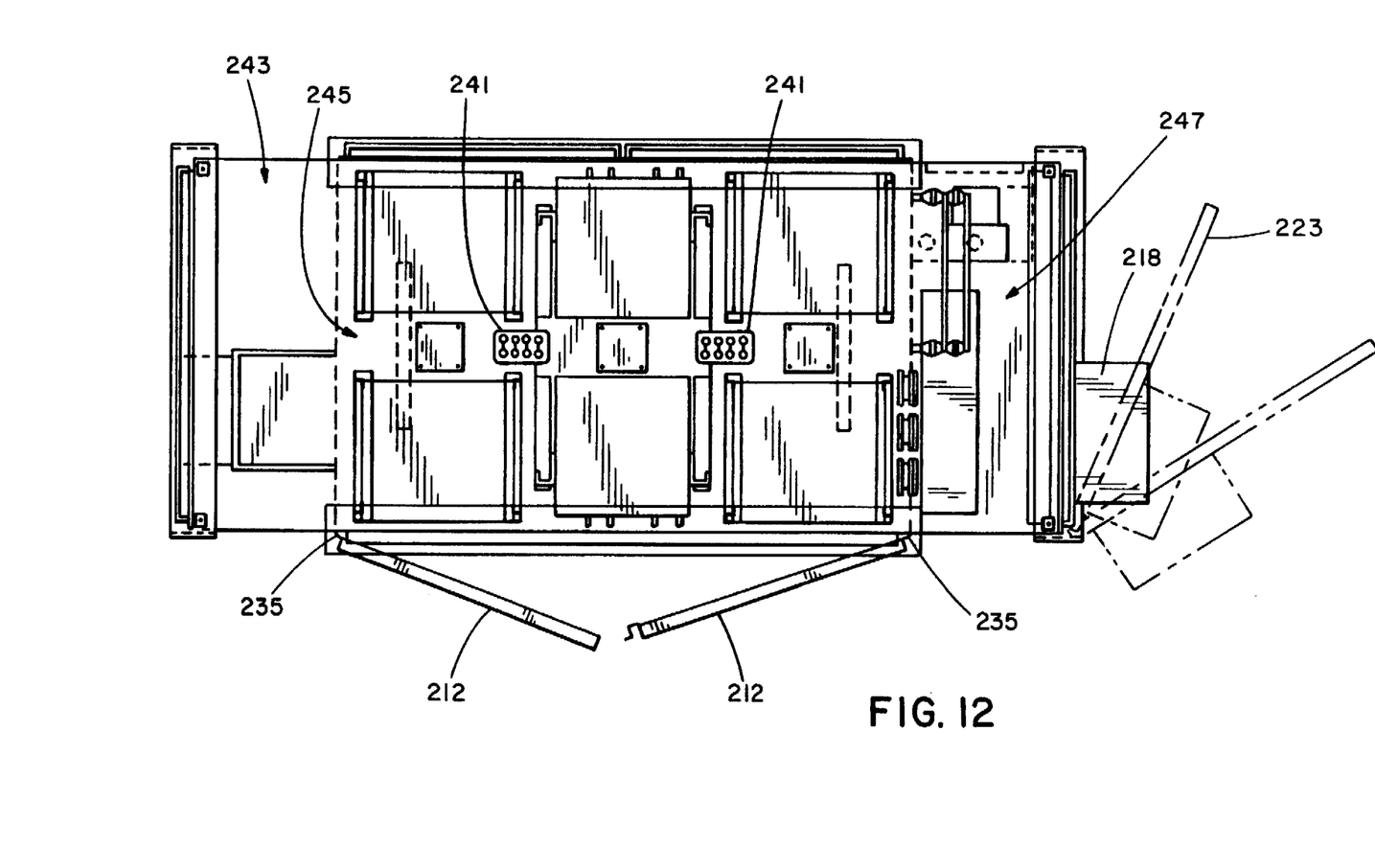

FIGS. 10, 11 and 12 show a larger enclosure 210, made in accordance with the present invention and having many of the features described above with reference to the enclosure shown in FIGS. 1 through 9. In FIGS. 10 through 12, reference numerals in the 200s are used, and where components similar to the earlier described enclosure are identified, reference numerals with corresponding tens and units digits are used.

Enclosed 210 has a door-mounted air conditioner 218 carried by a side door 223. A pair of front doors 212 are connected by hinges 235 to the enclosure 210. On the inside of the enclosure 210, as shown in FIG. 10, there is a removable rack system 221 which includes removable racks 215 used to support various pieces of electronic and telecommunications equipment, such as power supplies, amplifiers, radio frequency transmitters and receivers, and the like. The removal equipment racks 215 are designed to allow easy installation and equipment reconfiguration prior to installation inside an outdoor enclosure. The rack is designed in stainless steel for strength, rigidity and weight savings. The rack includes a roller and locking device to facilitate installation and securing to the floor and ceiling of the enclosure. It is designed for seismic Zone 4 earthquake applications.

At the base of the enclosure there is an optional battery drawer 226 for housing an emergency power supply. The batteries in the drawer 226 are to provide telephony and other users the ability to maintain operation of both the environmental and electronic equipment in the event of a commercial AC power interruption. This is accomplished via a combination of on-line interactive uninterruptible power supplies (UPS) and DC batteries and/or high surge inverters which can provide alternate power supplies up to 2 hours. In the event of longer outages, a walking beam interlock transfer switch (either manual or automatic) is available to provide a safety device to allow a portable generator hook-up via a generator receptacle mounted on the outside of the enclosure. This design offers a user both short and long term alternate AC power solutions to maintain service during emergencies like hurricanes and earthquakes.

In FIG. 11, various electrical protection devices are shown. An AC surge protector 227, an RF surge protector 228, and a lightning surge protector 229 are all intended to provide the circuitry within the enclosure 210 with a high degree of reliability and resistance to breakdown.

A digital remote control device is integrated within the AC load Center within either the AC surge protector 227 or at another location, and is connected to an alarm control block through an internal data modem and interfaced via a customer supplied network interface unit (NIU) typically located within the communications device for the telephony equipment. This digital remote control device provides performance status of the entire unit (temperature, humidity, electrical levels), history of electrical or environmental events (surges, sags, swells, or high temperature/low temperature, average temperature per hour or day). These devices can be remotely polled via PC software or programmed to dial out to a central switch facility and/or maintenance field technician with a problem code.

The enclosure 210 has four access doors. In addition to the two front doors 212, shown in FIG. 12, there is a side-hinged side door 223 which allows access to the power area 247, and a top-hinged door 240, shown in FIG. 10, which allows access to: the internally mounted air conditioner 248, which may be mounted to the frame of the enclosure or to the top-hinged door 240, and the plenum 249. The door 240 also allows ready access, from the side, to the equipment area 245 and to the air conditioner area 243, generally. Alternating current (A-C) outlets 241, shown in FIG. 12, are mounted into the floor of the enclosure.

The exterior of the enclosures 10 and 210 are preferably treated with a graffiti sealer (945 *Caribicote Clear Water Base Anti-Graffiti Coating* from Carbit Paint Co. of Chicago, Ill.), which is a non-toxic, water-based liquid and which dries to form a clear transparent and invisible membrane. It is designed as a semi-permanent barrier to protect the enclosures from the damaging effects of vandalism and graffiti. After being coated with spray paint, ink, magic marker fluid and other graffiti, it is removed with high pressure water or blast media, revealing the original surface (and new sealer is then reapplied to the site). The application of graffiti sealer on the outdoor enclosure allows sites in areas where the community requires graffiti removal, and allows the user an alternative to repainting.

Accordingly, an enclosure is provided that securely houses electronic equipment in an outdoor environment. The enclosure provided by the present invention is substantially tamper-proof, graffiti-proof and climate-controlled. The enclosure provides a sealed or closed environment to preclude any introduction of dust, dirt or insects into the space occupied by the electronic equipment. The enclosures provided by the present invention may be operated above ground or underground in vaults. Further, municipal electrical power may not be available in some areas and therefore the enclosures could be enlarged to accommodate a generator or a separate enclosure housing a generator can be provided adjacent to the enclosures housing the electronic equipment. Solar powered enclosures are contemplated.

Although some specific embodiments of the present invention have been illustrated and described, it will be at once apparent to those skilled in the art that variations may be made within the spirit and scope of the invention. Accordingly, it is intended that the scope of the invention be limited solely by the scope of the hereafter appended claims and not by any specific wording in the foregoing description.

I claim:

1. An enclosure for providing a secure and climate controlled environment for electronic equipment, the enclosure comprising:

a box including at least one door, the box including an interior for providing a sealed environment for electronic equipment, the box precluding substantial entry of outside air when the door is closed and locked, the box including an air conditioner and a closed loop heat exchanger, the closed loop heat exchanger transferring heat from air inside the box to ambient air that has been cooled by the air conditioner, means for bleeding condensation from inside the box without introducing ambient air into the box, a heater disposed inside the box for heating air inside the box, communication means for sending alarm signals to a remote control station, a low temperature alarm for generating low temperature alarm signals when the air inside the box drops below a first predetermined temperature, the communication means sending low temperature alarm signals to the remote control station, a high temperature alarm for generating high temperature alarm signals when the air inside the box exceeds a second predetermined temperature, the communication means sending high temperature alarm signals to the remote control station, an intrusion alarm for generating an intrusion alarm signal a predetermined time period after the door is opened.

2. The outdoor enclosure of claim 1 wherein:

the air conditioner includes a thermostat for activating the air conditioner when the air inside the box exceeds a third predetermined temperature and for deactivating the air conditioner when the air inside the box drops below a fourth predetermined temperature.

3. The outdoor enclosure of claim 2 wherein:

the heater includes a thermostat for activating the heater when the air inside the box drops below a fifth predetermined temperature and for deactivating the heater when the air inside the box exceeds a sixth predetermined temperature.

4. The outdoor enclosure of claim 3 wherein:

the enclosure further comprises means for deactivating the intrusion alarm within the predetermined time period after the door is opened so that the intrusion alarm signal is not generated, the communication means sending intrusion alarm signals to the remote control station when the intrusion alarm is not deactivated within the predetermined time period after the door is opened.

5. The outdoor enclosure of claim 4 wherein:

the enclosure further comprises a control means connected to the communication means, the control means enabling the first, second, third, fourth, fifth and sixth predetermined temperatures to be changed from the remote control station.

6. The outdoor enclosure of claim 5 wherein:

the box includes an exterior, the exterior is coated with a sealer to inhibit the application of graffiti and to facilitate the removal of graffiti from the exterior of the box.

7. The outdoor enclosure of claim 4 further comprising a water detection alarm for generating water alarm signals when a predetermined amount of water is present inside the box, the communication means sending water alarm signals to the remote control station.

8. The outdoor enclosure of claim 7 further comprising a shutdown alarm for generating a shut down alarm signal when power to the enclosure is interrupted, the communication means sending shut down alarm signals to the remote control station.

9. An outdoor enclosure for providing a secure and climate controlled environment for electronic equipment, the enclosure comprising:

a box structure including at least one door, the box structure being sealed to prevent any entry of outside air when the door is closed and locked, the box accommodating electronic equipment, the box being connected to a primary power supply, the door accommodating an air conditioner and a closed loop heat exchanger, the closed loop heat exchanger transferring heat from air inside the box to ambient air that has been cooled by the air conditioner, the air conditioner including a thermostat for activating the air conditioner when the air inside the box exceeds a first predetermined temperature and for deactivating the air conditioner when the air inside the box drops below a second predetermined temperature, means for bleeding condensation from inside the box without introducing ambient air into the box a heater disposed inside the box for heating air inside the box, the heater including a thermostat for activating the heater when the air inside the box drops below a third predetermined temperature and for deactivating the heater when the air inside the box exceeds a fourth predetermined temperature, communication means for sending alarm signals to a remote control station, a low temperature alarm for generating low temperature alarm signals when the air inside the box drops below a fifth predetermined temperature, the communication means sending low temperature alarm signals to the remote control station, a high temperature alarm for generating high temperature alarm signals when the air inside the box exceeds a sixth predetermined temperature, the communication means sending high temperature alarm signals to the remote control station, an intrusion alarm for generating an intrusion alarm signal a predetermined time period after the door is opened, means for deactivating the intrusion alarm within the predetermined time period after the door is opened so that the intrusion alarm signal is not generated, the communication means sending intrusion alarm signals to the remote control station when the intrusion alarm is not deactivated within the predetermined time period after the door is opened.

10. The outdoor enclosure of claim 9 wherein:

the enclosure is connected to an alternative power supply in the event of primary power supply failure.

11. The outdoor enclosure of claim 10 wherein:

the enclosure further comprises a control means connected to the communication means, the control means enabling the first, second, third, fourth, fifth and sixth predetermined temperatures to be changed from the remote control station.

12. The outdoor enclosure of claim 11 further comprising a water detection alarm for generating water alarm signals when water is present inside the box, the communications means sending water alarm signals to the remote control station.

13. The outdoor enclosure of claim 12 further comprising a shut down alarm for generating shut down alarm signals when power to the enclosure is interrupted, the communication means sending shut down alarm signals to the remote control station.

14. An outdoor enclosure for providing a secure and climate controlled environment for electronic equipment, the enclosure comprising:

a box structure including four sidewalls, a roof and a floor, at least one of the sidewalls accommodating a door which includes at least one lock equipped with a replaceable core, the floor being supported on a base structure for mounting on a concrete pad, the box structure being sealed to prevent any entry of outside air when the door is closed and locked, the box including an interior which includes shelving for accommodating electronic equipment, the box being connected to a primary electrical power supply, the door accommodating an air conditioner and a closed loop heat exchanger, the closed loop heat exchanger transferring heat from air inside the box to ambient air that has been cooled by the air conditioner, the air conditioner including a thermostat for activating the air conditioner when the air inside the box exceeds a first predetermined temperature and for deactivating the air conditioner when the air inside the box drops below a second predetermined temperature, the air conditioner including means for bleeding condensation from inside the box without introducing ambient air into the box, at least one heater disposed inside the box for heating air inside the box, each of said heaters including a thermostat for activating said heater when the air inside the box drops below a third predetermined temperature and for deactivating said heater when the air inside the box exceeds a fourth predetermined temperature, communication means for sending alarm signals to a remote control station, a low temperature alarm for generating low temperature alarm signals when the air inside the box drops below a fifth predetermined temperature, the communication means sending low temperature alarm signals to the remote control station, a high temperature alarm for generating high temperature alarm signals when the air inside the box exceeds a sixth predetermined temperature, the communication means sending high temperature alarm signals to the remote control station, an intrusion alarm for generating an intrusion alarm signal a predetermined time period after the door is opened, means for deactivating the intrusion alarm within the predetermined time period after the door is opened so that the intrusion alarm signal is not generated, the communication means sending intrusion alarm signals to the remote control station when the intrusion alarm is not deactivated within the predetermined time period after the door is opened.

15. An enclosure for providing a secure and climate controlled environment for electronic equipment, the enclosure comprising:

a box including at least one door, the box including an interior for providing a sealed environment for electronic equipment, the box precluding substantial entry of outside air when the door is closed and locked, the box including an air conditioner and a closed loop heat exchanger, the closed loop heat exchanger transferring heat from air inside the box to ambient air that has been cooled by the air conditioner, the air conditioner including a thermostat for activating the air conditioner when the air inside the box exceeds a third predetermined temperature and for deactivating the air conditioner when the air inside the box drops below a fourth predetermined temperature means for bleeding condensation from inside the box without introducing ambient air into the box, a heater disposed inside the box for heating air inside the box, the heater including a thermostat for activating the heater when the air inside the box drops below a fifth predetermined temperature and for deactivating the heater when the air inside the box exceeds a sixth predetermined temperature communication means for sending alarm signals to a remote control station, a low temperature alarm for generating low temperature alarm signals when the air inside the box drops below a first predetermined temperature, the communication means sending low temperature alarm signals to the remote control station, a high temperature alarm for generating high temperature alarm signals when the air inside the box exceeds a second predetermined temperature, the communication means sending high temperature alarm signals to the remote control station, an intrusion alarm for generating an intrusion alarm signal a predetermined time period after the door is opened, the enclosure further comprises means for deactivating the intrusion alarm within the predetermined time period after the door is opened so that the intrusion alarm signal is not generated, the communication means sending intrusion alarm signals to the remote control station when the intrusion alarm is not deactivated within the predetermined time period after the door is opened.

* * * * *